May 3, 1927.
J. W. MARDEN ET AL
1,626,685
ACTIVATION BY MEANS OF HYDROGEN FREE, CARBON BEARING GAS
Filed April 10, 1923
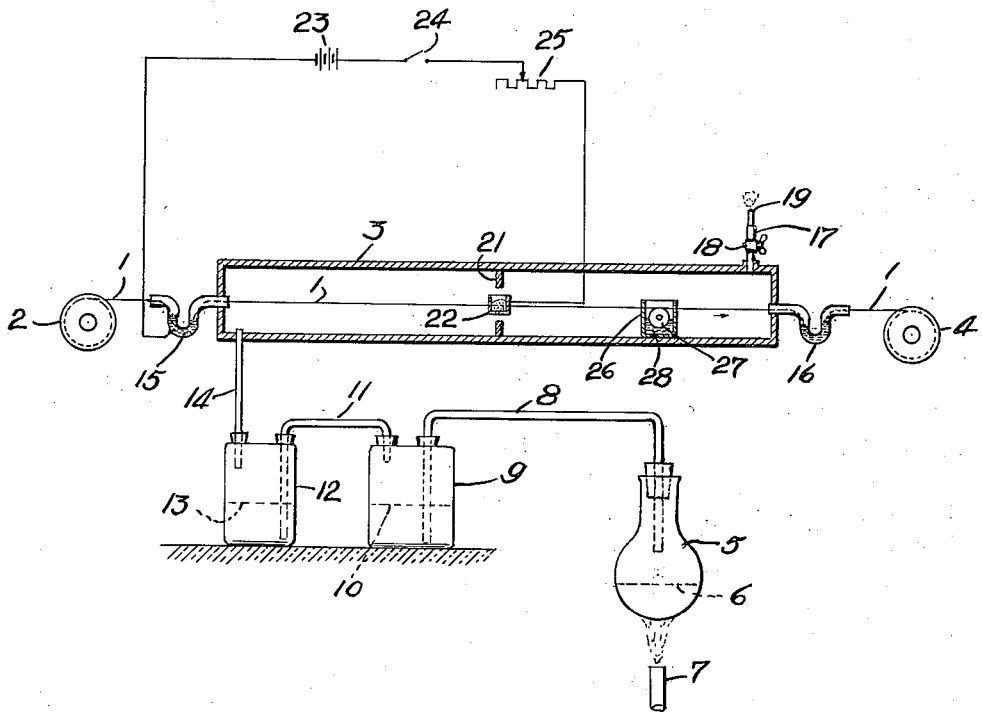
INVENTOR
JOHN W. MARDEN
THOMAS P. THOMAS
JOHN E. CONLEY
BY
ATTORNEY

Patented May 3, 1927.  1,626,685

UNITED STATES PATENT OFFICE.

JOHN WESLEY MARDEN, OF EAST ORANGE, AND THOMAS PHILIP THOMAS AND JOHN EDWARD CONLEY, OF BLOOMFIELD, NEW JERSEY, ASSIGNORS TO WESTINGHOUSE LAMP COMPANY, A CORPORATION OF PENNSYLVANIA.

ACTIVATION BY MEANS OF HYDROGEN-FREE, CARBON-BEARING GAS.

Application filed April 10, 1923. Serial No. 631,090.

This invention relates to the activation of filamentary material for electron-emission purposes and more particularly to activation of thoriated wire by means of hydrogen-free carbon-bearing gas.

An object of our invention is the activation of relatively great lengths of thoriated metal wire by means of a hydrogen-free, gaseous reducing agent.

Another object of our invention is the treatment of thoriated refractory metal wire by heating it in a carbon-bearing atmosphere, free from hydrogen or hydrogen compounds, whereby the electron emissivity thereof is increased by the development of free thorium thereon.

A further object of our invention is the reduction of at least some of the thoria content in thoriated tungsten wire or the like, in a continuous manner, by heating the same while passing it through an atmosphere of carbon monoxide or other suitable gaseous carbon compound, free from hydrogen.

A still further object of our invention is the continuous activation of thoriated tungsten wire by passing the same in a heated condition, through carbon monoxide to develop free thorium thereon, which may be protected from contamination by the atmosphere prior to introduction into an electron device as the cathode thereof, by a coating of an amyl-acetate solution of nitro-cellulose or the like.

Other objects and advantages will become apparent upon reading the following description.

Various methods have been proposed for treating thoriated filamentary material, preferably thoriated tungsten wire, to develop free or metallic thorium thereon, whereby electron-emission corresponding to thorium may be obtained from a filament composed principally of a more refractory metal, such as tungsten.

In the copending application of R. E. Myers, Serial No. 578,470, filed July 29, 1922, activation of thoriated filaments, and assigned to the Westinghouse Lamp Company, is disclosed a method of developing free thorium in or on thoriated filamentary material such as tungsten wire, by passing such material, while heated, through a hydrocarbon atmosphere. The wire or filamentary material emerges from said atmosphere after treatment, preconditioned for the development by free thorium thereon after introduction into an evacuated envelope, as an electron-emitting element therein and heating to a sufficiently high temperature.

Such treatment in a hydrocarbon atmosphere causes either the development of free thorium on the filament or the development of thorium carbide or tungsten carbide thereon, or a mixture of two or more of such materials. The exact reaction taking place depends, to some extent, on the kind of hydrocarbon used, the concentration thereof and the temperature to which the filament is heated. If the reaction of forming a carbide on the surface of the filament progresses to any considerable extent, the wire or filament is made brittle, because the carbide developed is hard and brittle.

According to our invention, we obviate the development of carbides on the surface of filamentary material treated, or at least of carbides of the hard and brittle character obtained when using hydrocarbons, by using, instead of a hydrocarbon atmosphere in which to treat the same, a hydrogen-free, carbon-bearing atmosphere, preferably carbon monoxide, although other gaseous carbon compounds, free from hydrogen, such as cyanogen may be used. Apparatus similar to that used for practicing the aforementioned hydrocarbon treatment of thoriated material may be used, modified to a slight degree if carbon monoxide is the gas selected by the provision of means for purifying the carbon monoxide, especially to free it from carbon dioxide and water vapor and to prevent its escape where it may be breathed by persons, as it is very poisonous.

After treatment in such gas, there results a certain amount of free thorium in or on the treated material and if it is not intended to use the material immediately for electron-emission purposes, the same is preferably coated with some varnish-like material, for example, nitro-cellulose dissolved in amyl-acetate, to prevent oxidation or atmospheric contamination of the thorium in or on the filament.

Our invention will be better understood by referring to the accompanying drawing the single figure of which illustrates, partly in longitudinal section and partly diagrammatically, apparatus for practicing our invention.

Thoriated filamentary material 1, preferably thoriated tungsten wire, which it is desired to activate, may be unwound from a spool 2 through a treating chamber 3 and upon a spool 4 driven by any suitable source of power (not shown).

The treating chamber 3 is provided with an atmosphere therein of a suitable gaseous carbon compound, free from hydrogen, which compound is preferably, and for the purpose of illustration, considered to be, carbon monoxide. Such gas may be generated and passed into the treating chamber in any desired manner, for example, it may be generated by burning coke or charcoal incompletely, as is well known, but, for the purpose of illustration, there is shown an apparatus for generating said gas from calcium oxalate or the like and purifying the gas developed prior to introduction to the treating chamber. A flask or other vessel 5 may contain a quantity of calcium oxalate 6 and be heated by any suitable means, such as a Bunsen burner 7. The gas generated by heating such compound is a mixture of carbon monoxide and carbon dioxide and contains water vapor. The gas may be passed, by means of a tube 8, into a vessel 9 and allowed to bubble through a solution of potassium hydroxide 10 or other means for absorbing carbon dioxide.

From the vessel 9, the gas is allowed to pass, by means of a tube or pipe 11, into vessel 12, where it is bubbled through concentrated sulphuric acid 13 or is passed over any suitable material for absorbing the moisture therefrom. From thence it may pass to treating chamber 3 by means of a pipe or tube 14. In order to prevent the escape of carbon monoxide from the treating chamber 3 around the apertures therein through which the filamentary material 1 passes, the material 1 is preferably drawn through a U-tube 15 provided in said aperture and containing mercury for preventing leakage of the carbon monoxide therethrough.

A similar tube 16 is provided at the other end of the treating chamber, and the filament is withdrawn through mercury contained therein. The only aperture allowed for the escape of the carbon monoxide from the treating chamber is an outlet tube 17, preferably provided with a valve 18 and a burner 19, so that the escaping carbon monoxide may be burned as it emerges from the treating chamber.

As shown, the treating chamber 3 is preferably provided with a partition 21 and has a mercury contact cup 22 adjacent said partition. The U-tube 15, with the mercury therein, and the mercury contact cup 22, may serve to heat the length of filament therebetween by electricity from a battery 23 or other source of current, through a switch 24 and a rheostat 25. Any suitable means may be provided for coating the filament 1 after it emerges from the mercury contact cup 22 and before it emerges from the treating box 3, for example, a getter cup or coating device 26 may be provided, as indicated, with a pulley or wheel 27 partly submerged in a solution of nitrocellulose in amyl-acetate 28, or other suitable varnish-like material.

The filament 1, by passing over or around the pulley 27, becomes coated with said material and protected from oxidation or other atmospheric contamination before coming into the air again. The coating of the filament with varnish-like protective material is preferable, if the same is not to be used for electron-emission purposes for some time, but is not necessary.

After passing through the coating device 26, the filament may emerge from the treating chamber 3 through the U-tube 16 and mercury contained therein and be wound upon spool or pulley 4. The action of the carbon monoxide or other treating gas used results in a reduction of at least some of the thoria in the filament to thorium, whereby the electron-emissivity thereof approaches that of pure thorium. The temperature of the filament is adjusted in accordance with the speed at which the same is drawn through the treating chamber and the length of filament between the mercury contacts, so that the best activation is obtained.

The speed, of course, depends on the length of the filament between the mercury contacts and is preferably quite slow, for example, not faster than a few feet a minute and the temperature to which the filament is heated during treatment is preferably approximately that of a dull-red heat. Filamentary material containing the usual amounts of thoria, for example, about 1 to 2%, is preferably used.

After the filament has been treated, it may be used on the radiotron or other electron device with a suitable clean-up agent for residual and occluded gases, such as aluminum or magnesium, if desired. It will be found that the electron-emissivity of such a filament or wire is substantially that of metallic thorium because it contains thorium therein or on its surface. If the filament is coated with a varnish-like material, the same will readily vaporize when heated in said device.

Although we have described what is now considered a preferred method of practicing our invention, it is to be understood that modifications may be made therein, within the spirit and scope of the appended claims, and such modifications, such as the substitution of other hydrogen-free, carbon compounds, for example, cyanogen or the like, for carbon monoxide, are part of our invention.

What is claimed is:

1. The method of activating thoriated filamentary material comprising heating the same in a hydrogen-free, carbon-bearing atmosphere to cause a reaction between the filamentary material and said atmosphere.

2. The method of activating thoriated metal wire comprising heating and passing it continuously through a gaseous carbon compound, free from hydrogen.

3. The method of activating thoriated tungsten wire comprising heating the same and passing it through a gaseous carbon compound free from hydrogen.

4. The method of activating thoriated tungsten wire comprising passing the same continuously in contact with carbon monoxide whereby at least some of the thoria therein is reduced to metallic thorium.

5. The method of activating thoriated tungsten filamentary material comprising heating the same to approximately a dull red heat and passing it while heated through an atmosphere consisting of carbon monoxide to cause a development of free thorium thereon.

6. The method of activating thoriated tungsten wire comprising passing it through a hydrogen-free, carbon-bearing reducing agent, heating the filament to a temperature sufficiently high to cause the gas to react therewith and coating the filament with a protective varnish-like material before it again emerges into the air.

7. The method of activating a thoriated tungsten wire comprising passing the same continuously through an atmosphere consisting of carbon monoxide, heating said wire to about a dull-red heat therein to cause an interaction of the carbon monoxide with the wire to develop thorium thereon and coating the wire with a protective material before it emerges from the treating chamber.

8. An apparatus for treating filamentary material in an atmosphere of carbon monoxide comprising a treating chamber with mercury contact devices through which a filament may be passed for heating the same electrically, one of said devices being in the form of a U-tube containing mercury through which the filament passes, another U-tube filled with mercury through which the filament is drawn from the chamber whereby no leakage occurs through the chamber at the points where the filament enters and leaves the same, means for generating carbon monoxide and passing it into the chamber and a burner provided for the escape and consumption of the carbon monoxide as it leaves the chamber.

In testimony whereof, we have hereunto subscribed our names this 9th day of April, 1923.

JOHN WESLEY MARDEN.
THOMAS PHILIP THOMAS.
JOHN EDWARD CONLEY.